2,818,330

PREPARATION OF REFRACTORY METALS

Harold A. Beatty, Grosse Pointe Farms, and Thomas P. Whaley, Royal Oak, Mich., assignors to Ethyl Corporation, New York, N. Y., a corporation of Delaware No Drawing. Application October 7, 1953
Serial No. 384,755

1 Claim. (Cl. 75—84)

This invention relates to the purification of refractory metals and more particularly to a new and improved process whereby impure refractory metals are converted to products of extremely high purity by deposition from molten metal solvents.

Refractory metals, such as titanium, zirconium, vanadium, chromium, molybdenum, tantalum, hafnium, thorium, uranium, and the like, are of increasing interest for structural and other uses. A variety of processes for their production has been proposed, among which perhaps the most important are reduction of the metal halides with alkali or alkaline earth metals and reduction of the metal oxides with alkaline earth metals. All or most of these processes yield products which often are not of sufficient purity to be utilized for structural and most other purposes.

An object of this invention is to provide a means for purification of refractory metals. A further object is to provide a new and improved process for the conversion of impure refractory metals to products of high purity and crystallinity. Additional objects will be apparent from the following description of the invention.

The above and other objects of the present invention are accomplished by precipitating a refractory metal from a molten, low melting metal solvent. Preferably, the solvent used is a metal or mixture of metals having a melting point of at least 0° C. and is selected from the class consisting of groups IIB, IIIA, IVA, and VA of the periodic chart of the elements. It will be seen (Deming, Fundamental Chemistry, Wiley, New York, second edition, 1947) that this preferred group of metal solvents includes cadmium, aluminum, gallium, indium, thallium, germanium, zinc, tin, lead, antimony, and bismuth. Mercury although a member of one of the preferred groups, is not a preferred metal because of its low melting point, and boron, carbon, silicon, nitrogen, arsenic, and phosphorus, each of which is a member of a preferred group, are not preferred because they are not truly metallic elements. When a high throughput of refractory metal is an important objective, it is preferable that the solvent be selected from the class consisting of zinc, tin, and lead, as these have higher solubilities for the refractory metals than most of the other solvents of the present invention. When it is desired to operate at as low temperatures as possible, the metal solvents having melting point below 400° C. are preferred. Such metals include cadmium, gallium, indium, thallium, tin, lead, and bismuth. However, in addition to these single solvents it is possible and frequently desirable to use mixed solvents comprising one or more of the metal solvents of the present invention, and in a great many cases a mixture of solvents, one or more of whose members has a melting point above 400° C., will have a melting point below 400° C. and thus falls within the range of especially preferred solvents in the present invention.

When a refractory metal is dissolved in a molten metal solvent of the class described, and the solution thereby formed is then cooled, it is found that there exists a range of temperatures at which the solution is resolved into a solid phase consisting of refractory metal, which may be pure or in the form of an inter-metallic compound and a molten mother liquor phase. When this solid refractory metal phase is separated from the mother liquor phase, it is found that the refractory metal thereby obtained is of an enhanced degree of purity. In other words, when a solution of refractory metal in molten, low melting metal solvent is cooled to a temperature at which at least a portion of solid refractory metal precipitates from the solution, the refractory metal or compound so obtained is of a crystalline nature and a high state of purity. As an example of the results obtained in carrying out the present invention, when a sample of zirconium of less than 95 percent metal content is dissolved in lead at a temperature of 800° C. with efficient agitation to assure that the solution is homogeneous, and the solution then cooled to a temperature of 350° C., purified zirconium of greater than 99 percent metal content precipitates and can be recovered in such state of purity. With other refractory metals and with other solvents of our invention similar procedures lead to equally satisfactory results.

For best results in the practice of our invention, a large excess of molten metal solvent should be used so as to insure not only complete dissolution of the refractory metal but also to yield a fairly dilute solution. Thus, for example, good results are obtained when the initial concentration of refractory metal in molten metal solvent is kept below about 10 percent, and for material of the highest purity, initial concentrations of the refractory metal on the order of about 1 percent are very beneficial.

The differential between the temperature of dissolution and the temperature of crystallization is preferably kept as great as is convenient in the equipment employed, as the highest throughput and highest recovery of the refractory metal is obtained under such conditions. For example, using tin as the solvent, ideally it would be preferred to dissolve refractory metal, such as chromium, at a temperature approaching 2270° C., the boiling point of tin, and cooling the resultant solution to almost 232° C., the melting point of tin. However, good results are obtained when the temperature of dissolution is much less than 2270° C. and also when the temperature of precipitation is much higher than 232° C. Dissolution temperatures higher than the boiling point of the metal solvent can be used in pressure equipment, but it is more expedient to operate at about atmospheric pressure.

The purity of the refractory metal product obtained depends to some extent on the rate of cooling from the temperature of dissolution to the temperature of precipitation. In general, the lesser the rate of cooling the higher will be the purity of the product obtained.

Our process is adaptable either to batch or continuous operation. In a typical batch operation a charge of metal solvent is melted in an externally heated pot equipped with mechanical or other means for agitation. To this is added, at the temperature of dissolution, the desired amount of impure refractory metal, and the mixture is stirred at dissolution temperature for a period of time long enough to insure that the refractory metal has all dissolved. The mixture is then cooled to the precipitation temperature and transferred to a filter or centrifuge to effect separation of the solid refractory metal and the molten mother liquor. The purified refractory metal is then separated from adhering mother liquor by either physical or chemical means.

The preferred physical means of removing adherent mother liquor from the purified refractory metal is distillation, since all the solvents of the present invention possess much higher vapor pressures than do any of the refractory metals. Chemical means useful in separating adherent solvent metal from the refractory metal product include any means to cause reaction of the solvent metal while leaving the refractory metal substantially unattacked. Thus, with most of the refractory metal-solvent metal combinations of the present invention, mere attack with acid will suffice. With others, as in the case of aluminum as the solvent, reaction with alkali, such as sodium hydroxide, will result in removal of the solvent metal. Other chemical means of effecting this purification will be apparent to those skilled in the art. Another means, which is in part physical and in part chemical, comprises washing the refractory metal contaminated with molten metal solvent with a molten metal of higher electropositivity and lower boiling point than the solvent metal, thus displacing the solvent metal and in some cases forming a compound with the refractory metal. For example, when purifying titanium from molten lead solvent, a solid containing both titanium and lead is obtained. On washing with molten sodium, the lead is displaced to form sodium-lead alloy, and the titanium is then contaminated with small amounts of sodium. This sodium is easily removed by distillation or other means.

In one continuous embodiment of the present invention the process is carried out in a cyclic system in which the flow of materials is maintained in one direction by means of pumps, directional agitation, thermal convection, or the like. Molten metal solvent is continually cycled through the equipment and passed through two or more alternate zones, one of which may be designated the "hot" zone and the other, the "cold" zone. The hot zone is heated by external means so as to be maintained at the temperature of dissolution. At a point within this dissolution temperature zone impure refractory metal is fed through a system of locks to the molten solvent metal, in which it dissolves. The length of time that a given minuscule of the mixture is resident in the hot zone is sufficient to permit complete dissolution of the refractory metal in the solvent. The solution then passes to the cold zone in which the purified refractory metal precipitates and is retained on a screen or other suitable means on which it is removed from the system from time to time. The mother liquor is recirculated to the hot zone where it receives more impure refractory metal, and the process continues in this cyclic manner. Make-up metal solvent is added from time to time as needed. The solid refractory metal which is removed periodically from the system is purified of adherent mother liquor by physical or chemical means, such as those described above.

Some of the solvents and refractory metals of the present invention react with each other during the purification process to form the so-called intermetallic compounds, such as $TiAl_3$ in the case of titanium and aluminum. These compounds may be decomposed by physical or chemical means as described above to result in obtaining the pure refractory metal.

It has been found beneficial to incorporate small amounts of highly active metals, such as alkali or alkaline earth metals, in the bath of molten metal solvent. Apparently these metals act as getters in removing trace amounts of impurities from the refractory metal in solution and yield a precipitated refractory metal of even higher purity than that obtained without the use of the getters in the solutions.

We claim:

Process for purifying impure titanium comprising contacting the impure titanium with molten lead at a temperature approaching the boiling point of said molten lead to cause the lead to dissolve the titanium in the impure material, the amount of lead being such that the solution has not more than 10% titanium by weight, then slowly cooling the thereby formed solution to a temperature almost as low as the melting point of lead so as to precipitate a mixed titanium-lead solid from the liquid mother liquor, separating the precipitated titanium-lead solid from the mother liquor and removing the lead from the separated solid.

References Cited in the file of this patent

UNITED STATES PATENTS

| | | |
|---|---|---|
| 914,354 | Kuzel | Mar. 2, 1909 |
| 2,034,372 | Betterton et al. | Mar. 17, 1936 |
| 2,207,461 | Kemp | July 9, 1940 |
| 2,382,723 | Kirsebom | Aug. 14, 1945 |
| 2,468,660 | Gjedebo | Apr. 26, 1949 |
| 2,471,899 | Regner | May 31, 1949 |

OTHER REFERENCES

Metal Industry, Sept. 16, 1949, p. 233.

Chem. Abstracts, vol. 43, p. 7880, Oct. 25, 1949.

Gmelin's Handbuch der Anorganischen Chemie, System No. 41 "Titan," p. 201; pub. 1951.

Metallurgical advisory Committee on Titanium Information Bulletin No. T4: "Equilibrium Diagrams of Titanium Alloy Systems." Compiled by the Metallurgical Staff of N. Y. Univ.; pub. March 1952, Watertown Arsenal, Watertown, Mass., pp. 3–4.

Journal of Metals, June 1952 (Transactions AIME), pp. 609–614, Ti Digest.